US012730600B2

(12) United States Patent
Han et al.

(10) Patent No.: US 12,730,600 B2
(45) Date of Patent: Sep. 8, 2026

(54) PROCESSING METHOD AND DISPLAY DEVICE

(71) Applicant: Lenovo (Beijing) Limited, Beijing (CN)

(72) Inventors: Shuang Han, Beijing (CN); Zhiyong Lu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/805,243

(22) Filed: Aug. 14, 2024

(65) Prior Publication Data

US 2025/0077157 A1 Mar. 6, 2025

(30) Foreign Application Priority Data

Aug. 31, 2023 (CN) ........................ 202311120493.8

(51) Int. Cl.
*G06F 3/14* (2006.01)

(52) U.S. Cl.
CPC .................................. *G06F 3/1423* (2013.01)

(58) Field of Classification Search
CPC .... G06F 3/1446; G06F 3/1454; G06F 3/1423; G09G 2300/026; G09G 3/32; G09G 5/006; G09G 2360/04; G09G 2370/022; G09G 2370/04; G09F 9/3026
See application file for complete search history.

(56) References Cited

U.S. PATENT DOCUMENTS

2004/0008155 A1* 1/2004 Cok ...................... G06F 3/1446 345/1.3
2013/0063503 A1* 3/2013 Ryu ...................... G09G 5/006 345/698
2015/0084837 A1* 3/2015 Mese .................... G06F 3/1446 345/1.3
2017/0139664 A1* 5/2017 Park ...................... H01R 24/60
2020/0258471 A1* 8/2020 Wang .................... G06F 3/1423
2022/0208057 A1* 6/2022 You ....................... G06F 3/1446
2023/0004338 A1* 1/2023 Slade .................... G06F 3/1454

* cited by examiner

*Primary Examiner* — Sujit Shah
(74) *Attorney, Agent, or Firm* — ANOVA LAW GROUP, PLLC

(57) ABSTRACT

A processing method includes: outputting, by first display device, trigger information to a second display device in response to a trigger condition being met; obtaining, by the first display device, second identification information output by the second display device in response to the trigger information; obtaining, by the first display device, first identification information of the first display device; and transmitting, by the first display device, the first identification information and the second identification information to an electronic device, the first identification information and the second identification information representing a connection sequence of the first display device and the second display device. The electronic device, the first display device, and the second display device are connected in sequence, and the first display device obtains first image data from the electronic device and transmits part or all of the first image data to the second display device.

20 Claims, 6 Drawing Sheets

Display device C

Display device D

PROCESSING METHOD AND DISPLAY DEVICE

CROSS-REFERENCE TO RELATED APPLICATION

This application claims priority to Chinese Patent Application No. 202311120493.8, filed on Aug. 31, 2023, and the entire content of which is incorporated herein by reference.

TECHNICAL FIELD

The present disclosure relates to the technical field of display technology, and more particularly, to a processing method and a display device.

BACKGROUND

In a system where multiple devices are interconnected via data cables, these devices can be connected to each other based on a variety of topologies. For example, multiple devices can be connected one by one in a chain structure, and the system formed by this arrangement can be called a chain system.

Currently, communication efficiency of the chain system is low and cannot meet the needs.

SUMMARY

One aspect of the present disclosure provides a processing method. The method includes: outputting, by first display device, trigger information to a second display device in response to a trigger condition being met; obtaining, by the first display device, second identification information output by the second display device in response to the trigger information; obtaining, by the first display device, first identification information of the first display device; and transmitting, by the first display device, the first identification information and the second identification information to an electronic device, the first identification information and the second identification information representing a connection sequence of the first display device and the second display device. The electronic device, the first display device, and the second display device are connected in sequence, and the first display device obtains first image data from the electronic device and transmits part or all of the first image data to the second display device.

Another aspect of the present disclosure provides a display device. The display device is a first display device. The first display device includes: a first interface connected to an electronic device; a second interface connected to a second display device; a display apparatus configured to display image data obtained from the electronic device; and a processor configured to: output trigger information to the second display device in response to a trigger condition being met; obtain second identification information output by the second display device in response to the trigger information; obtain first identification information of the first display device; and transmit the first identification information and the second identification information to the electronic device, the first identification information and the second identification information representing a connection sequence of the first display device and the second display device. The electronic device, the first display device, and the second display device are connected in sequence, and the first display device obtains first image data from the electronic device and transmits part or all of the first image data to the second display device.

BRIEF DESCRIPTION OF THE DRAWINGS

To more clearly illustrate the technical solutions in the embodiments of the present disclosure, drawings required for the description of the embodiments are briefly described below. Obviously, the drawings described below are merely some embodiments of the present disclosure. For those skilled in the art, other drawings can be obtained based on these drawings without creative efforts.

DETAILED DESCRIPTION OF THE EMBODIMENTS

To enable those skilled in the art to better understand the technical solutions of the embodiments of the present disclosure, the technical solutions in the embodiments of the present disclosure will be clearly and completely described below in conjunction with the accompanying drawings. Obviously, the described embodiments are merely part of the embodiments of the present disclosure, not all of the embodiments. Based on the embodiments of the present disclosure, all other embodiments obtained by those skilled in the art without creative work are within the scope of the present disclosure.

Figure 1:
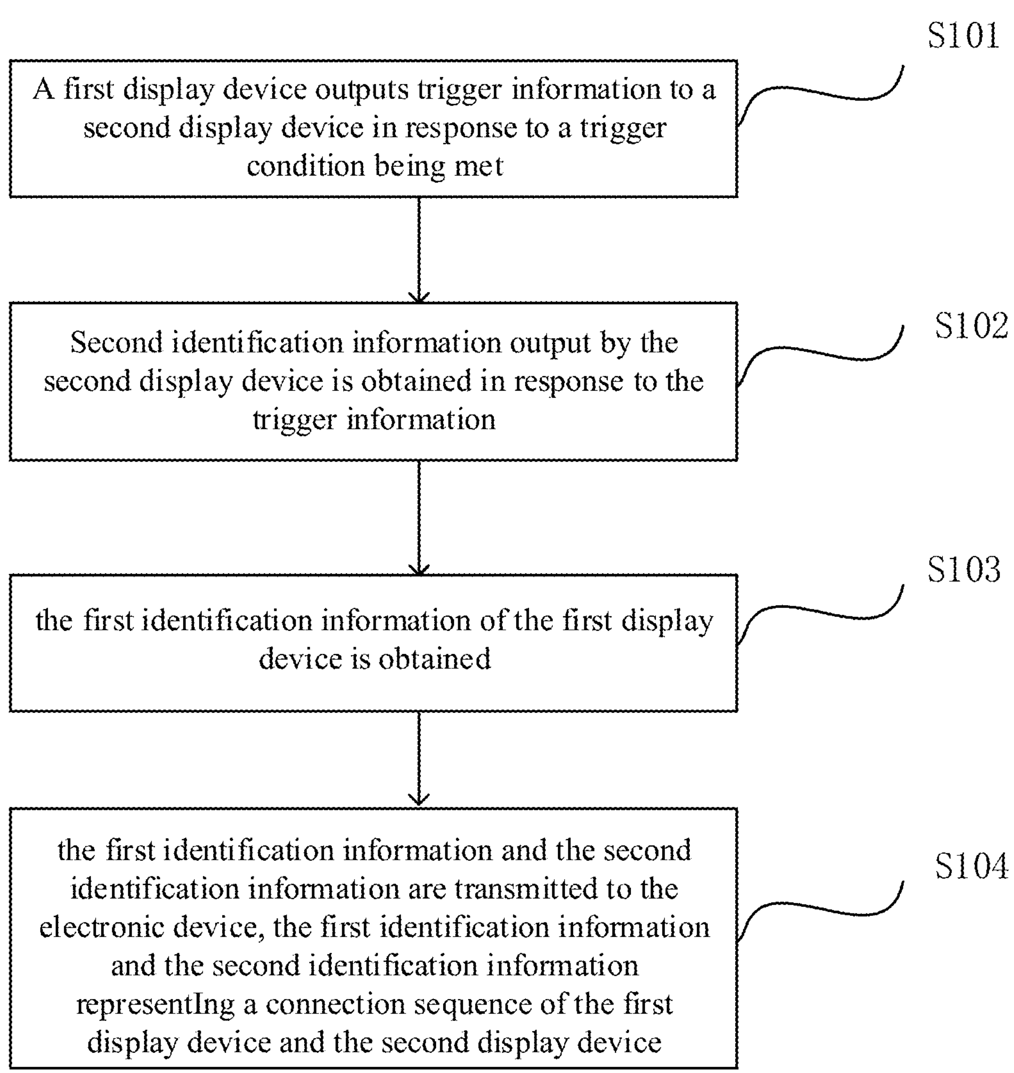
FIG. 1 is a flowchart of a processing method according to some embodiments of the present disclosure.

The present disclosure provides a processing method. FIG. 1 is a flowchart of a processing method according to some embodiments of the present disclosure. As shown in FIG. 1, the method may include the following processes.

At S101, a first display device outputs trigger information to a second display device in response to a trigger condition being met.

The first display device may be any display device in a chain system that is connected to a plurality of devices at the same time.

Figure 2:
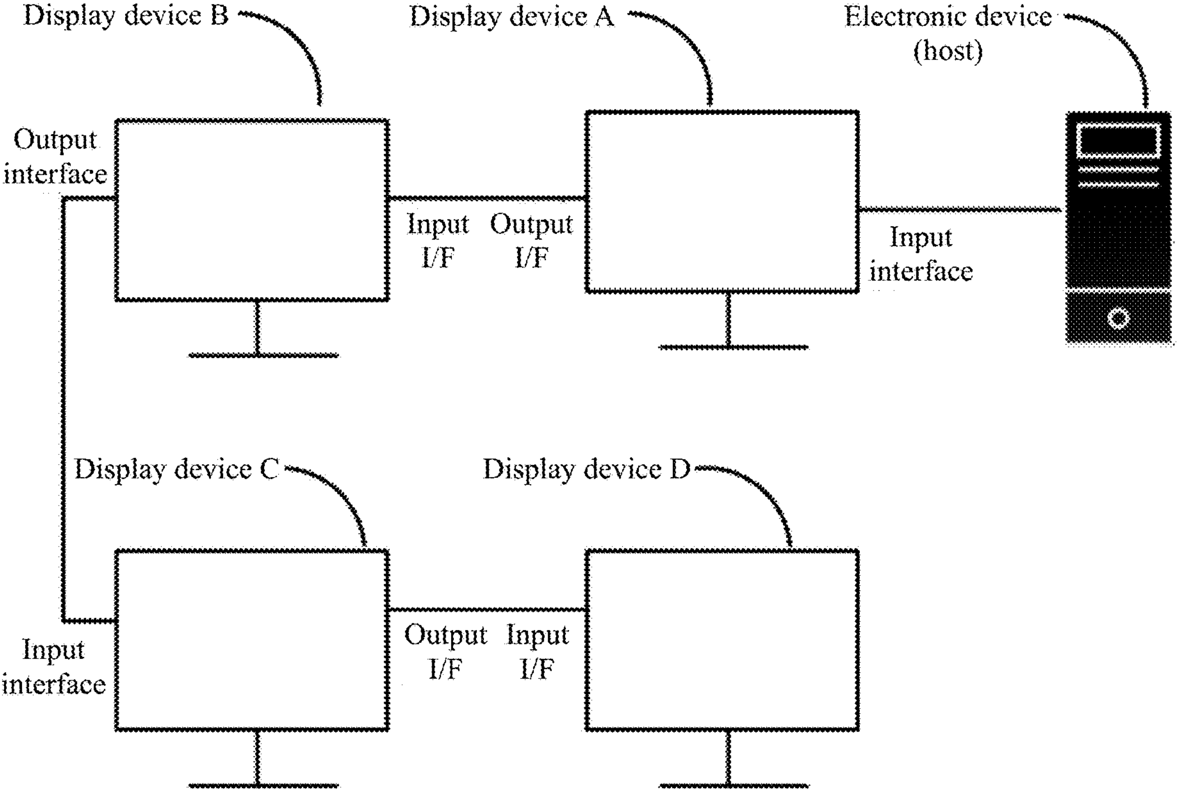
FIG. 2 is a schematic diagram of a chain system according to some embodiments of the present disclosure.

Taking the chain system shown in FIG. 2 as an example, the chain system includes an electronic device (also called a host) and four display devices connected in sequence. The four display devices are recorded as display device A, display device B, display device C, and display device D in the order of connection to the electronic device, and each display device includes at least one input interface and at least one output interface. Connection relationship between the above devices may be seen in FIG. 2, and no further description is given.

In the chain system as shown in FIG. 2, the first display device may be any one of display device A, display device B, and display device C. In the chain system, multiple electronic devices connected in series to an output interface of the electronic device are called a display device chain. Taking FIG. 2 as an example, display devices A to D are connected in series to the output interface of the electronic device, so display devices A to D can be called the display device chain.

The second display device may be a display device directly connected to the first display device and indirectly connected to the electronic device through the first display device.

Still taking the chain system of FIG. 2 as an example, when the first display device is display device A, the second display device may be display device B, and when the first display device is display device C, the second display device may be display device D.

In some embodiments, meeting the trigger condition includes at least one of the following: Condition 1, the first display device obtains a target signal output by the electronic device; Condition 2, the first display device establishes a connection with the electronic device.

The present disclosure does not limit a condition for the electronic device to output the target signal. For example, the electronic device may output the target signal after determining that it is connected to the first display device, or may output the target signal in response to a user's trigger operation.

The target signal output by the electronic device may be a location information request for requesting identification information from each display device connected thereto.

For Condition 2, the first display device may detect in real time whether each of its input interfaces is connected to an electronic device. If it is detected that any of its input interfaces is connected to an electronic device, the first display device determines that it is connected to the electronic device.

When the trigger condition is Condition 1, the trigger information output by the first display device may be the target signal output by the electronic device, that is, the first display device may receive the target signal provided by the electronic device and then forward the target signal to the second display device.

When the trigger condition is Condition 2, the trigger information output by the first display device may be a request generated by the first display device, for example, the location information request generated by the first display device.

In some embodiments, the first display device obtains first image data from the electronic device and transmit part or all of the first image data to the second display device.

The first image data may include two parts of image data for display on two display devices, recorded as part A image data for display on the first display device, and part B image data for display on the second display device. In this case, the first display device may display part A image data and transmit part B image data to the second display device.

The first image data may only include image data for display on the first display device, that is, part A image data. In this case, the first display device may directly display the received first image data without transmitting the first image data to the second display device.

The first image data may only include image data for display on the second display device, that is, part B image data. In this case, the first display device may transmit all the received first image data to the second display device.

At S102, second identification information output by the second display device in response to the trigger information is obtained.

In some embodiments, the second display device may transmit the second identification information and attribute information thereof, that is, second attribute information, to the first display device, so that the first display device can determine a corresponding relationship between the second identification information and the second attribute information.

The attribute information of a display device may be any information that can uniquely represent the display device. For example, the attribute information of the display device may be a device serial number of the display device.

The second display device may obtain the second identification information in the following manner. The second display device outputs the received trigger information from its own output interface. If the trigger information is successfully output, the second display device waits for a third display device connected to its own output interface to feedback third identification information. After receiving the third identification information, the second display device determines the second identification information according to the third identification information.

If the second display device fails to output the trigger information, the second display device determines the second identification information of the second display device according to a connection sequence of the second display device.

For example, a connection relationship between the second display device and the first display device is that an input interface of the second display device is directly connected to an output interface of the first display device. Based on this connection relationship, the second display device determines its own connection sequence as follows. The second display device is a first piece of display device connected to the output interface of the first display device. Further, the second display device can determine the second identification information that represents the connection sequence based on the connection sequence.

In the above method of obtaining the second identification information, for the process of the second display device determining the second identification information according to the third identification information, reference can be made to the process of the first display device determining the first identification information according to the second identification information in the following S103, which will not be described in detail herein.

The second identification information may be any information that represents the connection sequence of the second display device.

For example, the second identification information may be a serial number that represents the connection sequence of the second display device. The serial number may be any positive integer, or any integer, or any real number. For convenience of understanding, the following description is based on the example that the serial number is a positive integer.

For example, the second identification information fed back by the second display device may be serial number 1. Based on serial number 1, the first display device determines that the second display device is the first piece of display device connected to its output interface.

For example, when the output interface of the second display device is further connected to the third display device, the second identification information fed back by the second display device may be serial number 2, which indicates that the second display device is a second piece of display device from an end of the display device chain.

The end of the display device chain refers to the display device on the display device chain whose output interface is not connected to any other display devices. Taking FIG. 2 as an example, in the chain system, the end of the display device chain refers to display device D whose output interface is not connected to any other display devices.

In another example, the second identification information may be a record in a data structure with a specific format. The data structure includes a plurality of records, each of which corresponds to a display device, and the plurality of records are arranged in the connection sequence of the display devices, such that the electronic device can obtain the connection sequence of the corresponding display devices according to an arrangement sequence of these records.

In this case, each record in the data structure may include a sequence number of the display device corresponding to the record, which may be the device serial number of the display device, may be a random number randomly generated by the display device and not repeated with other display devices, or may include the device serial number and a random number.

For example, when the output interface of the second display device is further connected to the third display device, the second identification information sent by the second display device to the first display device may have the following data structure: {Random number of the second display device; Random number of the third display device}.

Based on the data structure, the first display device determines that the connection sequence of the second display device and the third display device is that the second display device is directly connected to the output interface of the first display device, and the third display device is connected to the output interface of the second display device, and is indirectly connected to the first display device through the second display device.

The way in which the third display device obtains the third identification information is consistent with the way in which the second display device obtains the second identification information, and will not be repeated herein.

At S103, the first identification information of the first display device is obtained.

In some embodiments, S103 may further include: determining the first identification information according to the second identification information.

The first display device may determine the first identification information according to the second identification information in various methods. The following provides several optional methods to determine the first identification information according to the second identification information.

Method 1, determining the first identification information according to a first relative position relationship between the first display device and the second display device, and the second identification information of the second display device.

This method may be applied in a scenario where the serial number is used as the identification information. In this method, the first display device calculates the first identification information based on the second identification information according to the first relative position relationship.

For example, when the second identification information is serial number 2, the first display device may determine that the first relative position relationship is that the first display device is a display device located before the second display device, so the first display device may add 1 to the second identification information to obtain the first identification information, that is, serial number 3.

Method 2, obtaining identification information that is not repeated with the second identification information as the first identification information.

This method is applicable to the case where the identification information is a record in the data structure. In method 2, the first display device may generate the first identification information according to a certain rule, or randomly generate the first identification information that does not repeat the second identification information, and then insert the first identification information into a certain data structure used to store the identification information according to the relative position relationship between the first display device and the second display device.

For example, when the second display device outputs the second identification information to the first display device, it outputs the following data structure: {Random number of the second display device; Random number of the third display device}.

After the first display device obtains the data structure, it generates a new random number different from the existing random numbers in the data structure, determines the new random number as the first identification information, and then in the data structure, according to the relative position relationship between the first display device and the second display device, inserts the first identification information into the second identification information, that is, inserts it above the random number of the second display device, and obtains the following new data structure: {Random number of the first display device; Random number of the second display device; Random number of the third display device}.

Further, if the first display device obtains identification information of other display devices in addition to the second identification information, such as the third identification information, then in method 2, the first display device needs to obtain the first identification information that is not repeated with these existing identification information, for example, the first identification information that is not repeated with the second identification information and the third identification information.

In some embodiments, after the first display device obtains the identification information output by the second display device, the identification information output by the second display device may be modified to obtain modified second identification information. Further, if the second display device also provides the identification information of the third display device, the identification information of the third display device may be further modified to obtain modified third identification information.

In other words, after the first display device obtains the identification information (which may include the second identification information and the third identification information) output by the second display device, before executing S104, the following processes may be performed. The third identification information output by the third display device in response to the trigger information is obtained through the second display device, and the trigger information is transmitted from the second display device to the third display device, and the third display device is connected to the first display device through the second display device. The second identification information is modified according to the first relative position relationship to obtain the modified second identification information. The third identification information is modified according to the first relative position relationship to obtain the modified third identification information, and the modified third identification information may represent the connection sequence of the third display device.

In this case, when the first display device executes S104, it may specifically: transmit the first identification information, the modified second identification information, and the modified third identification information to the electronic device.

Further, in some embodiments, if the first display device performs the process of modifying the identification information output by the second display device, the first display device can determine the first identification information according to the second identification information through Method 3.

Method 3, determining the second identification information as the first identification information, and modifying the second identification information according to the first relative position relationship to obtain the modified second identification information, which includes determining the third identification information as the modified second identification information.

For example, the second identification information provided by the second display device to the first display device is serial number 1, and the third identification information is serial number 2. The first display device determines the second identification information as the first identification information according to the first relative position, determines the third identification information as the modified second identification information, and modifies the third identification information from serial number 2 to serial number 3. Thus, the first identification information is obtained as serial number 1, the modified second identification information is serial number 2, and the modified third identification information is serial number 3. Further, the third identification information provided by the second display device to the first display device may also be the third identification information modified by the second display device.

For example, the original third identification information provided by the third display device may be serial number 1. After the second display device obtains the third identification information, based on the relative position relationship between the second display device and the third display device, the third identification information is modified to serial number 2, and the original third identification information is determined as the second identification information, that is, the second identification information is determined to be serial number 1.

At S104, the first identification information and the second identification information are transmitted to the electronic device. The first identification information and the second identification information may represent the connection sequence of the first display device and the second display device.

When the display device outputs its own identification information, it may also output its own attribute information. For example, the first display device outputs the first identification information and the first attribute information, and the second display device outputs the second identification information and the second attribute information. Correspondingly, S104 may include: transmitting the first identification information and the first attribute information of the first display device, and the second identification information and the second attribute information of the second display device to the electronic device.

In some embodiments, the first display device may also directly transmit the first identification information and the second identification information to the electronic device without transmitting the attribute information of the first display device and the second display device.

The present disclosure provides the following beneficial effects. The display device outputs its own identification information and attribute information at the same time, which facilitates the electronic device to quickly determine the corresponding relationship between the identification information and the attribute information of each display device in the chain system, and to manage the display devices in the chain system based on the corresponding relationship.

In some embodiments, the first display device may be indirectly connected to the electronic device through a fourth display device. Combined with the configuration shown in FIG. 2, the first display device may be display device B therein, and the fourth display device may be display device A therein.

In this case, the process of the first display device executing S103 may include: obtaining feedback information output by the fourth display device, the feedback information including the fourth identification information of the fourth display device and at least one update identification information; determining, based on a second relative position relationship between the first display device and the fourth display device, and the fourth identification information, that target update identification information in the at least one update identification information is the first identification information of the first display device.

The processing method provided in the embodiments of the present disclosure may be applied to a single-chain chain system or a multi-chain chain system.

The multi-chain chain system refers to a chain system with the following characteristics: the electronic device has multiple output interfaces, and each output interface is sequentially connected to multiple display devices.

For example, one output interface of the electronic device is sequentially connected in series with display devices A, B, and C, and another output interface of the electronic device is sequentially connected in series with display devices D, E, and F. The chain system is a multi-chain chain system, in which the sequentially connected display devices A, B and C constitute one display device chain, and the sequentially connected display devices D, E and F constitute another display device chain.

In the multi-chain chain system, each display device on a display device chain may provide identification information to the electronic device according to the processing method of the present disclosure, and the provided identification information may represent the connection sequence of itself on the display device chain to which it belongs.

Figure 3:
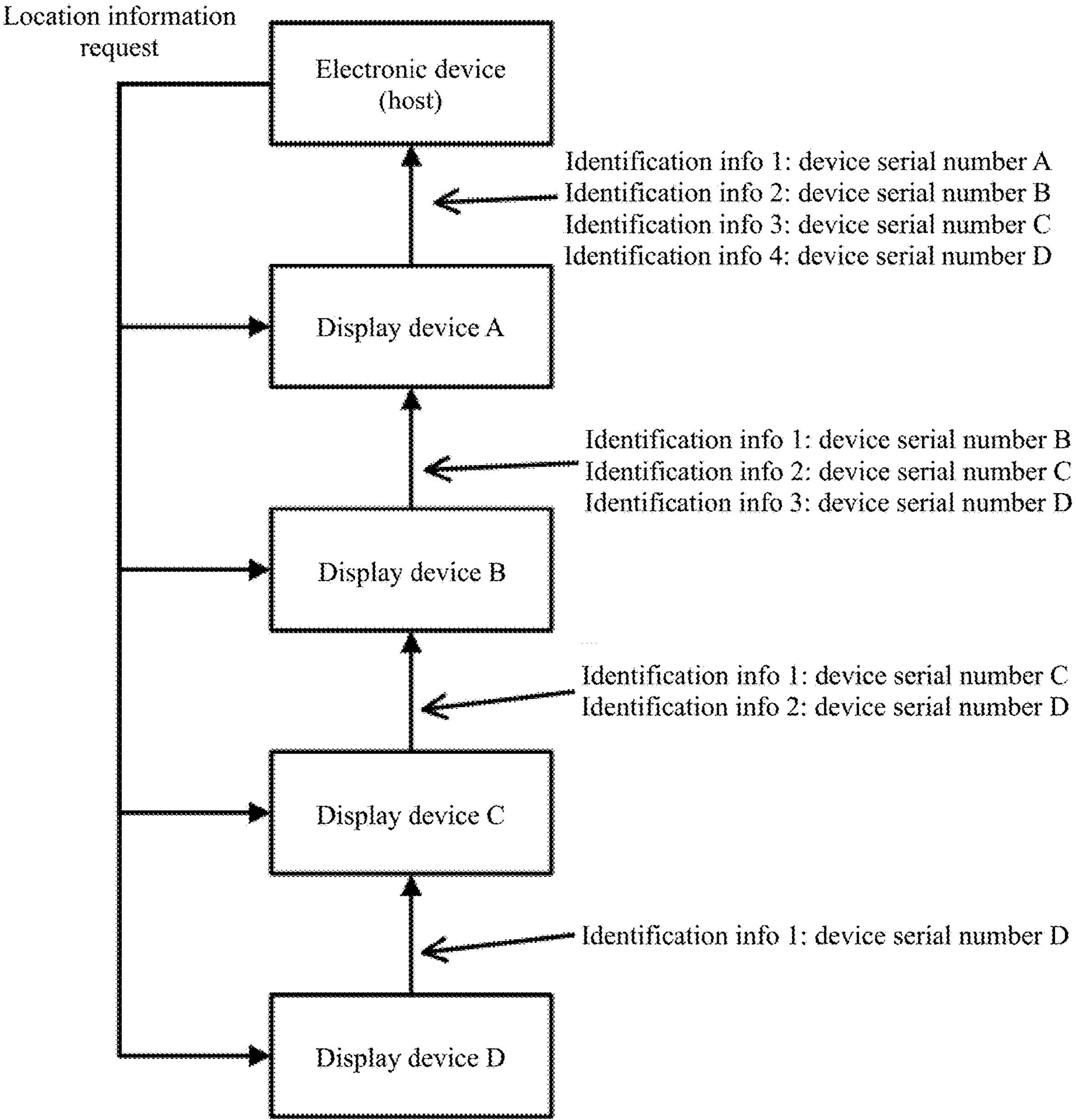
FIG. 3 is schematic diagram of obtaining identification information of a display device according to some embodiments of the present disclosure.

To facilitate understanding of the processing method of the present disclosure, the chain system shown in FIG. 3 is used as an example to illustrate the execution process of the processing method of the present disclosure.

The electronic device (hereinafter referred to as the host) sends a location information request to display device A, and display device A transmits the location information request to display device B, display device B transmits it to display device C, and display device C transmits it to display device D.

The location information request is equivalent to the target signal, and the transmission of the location information request between display devices A to D is equivalent to the first display device outputting trigger information to the second display device in S101.

After receiving the trigger information, display device D, as the second display device, determines its own identification information, and then transmits its own identification information and attribute information to the corresponding first display device, that is, display device C. As shown in FIG. 3, the second identification information provided by display device D is identification information 1, and the second attribute information is device serial number D.

Display device C, as the first display device, executes S102 to receive the information provided by display device D. Subsequently, display device C executes S103 to obtain its own first identification information according to the second identification information in Method 3, and at the same time, modifies the second identification information to obtain the modified second identification information. Thereafter, display device C transmits its own identification information and attribute information, i.e., identification information 1 and device serial number C, and the identification information and attribute information of display device D, i.e., identification information 2 and device serial number D, to display device B.

After receiving the above information, display device B also obtains its own identification information according to the identification information provided by display device C in Method 3, and at the same time modifies the identification information provided by display device C. At this time, display device B is equivalent to the first display device, and display device C is equivalent to the second display device. Finally, display device B transmits its own identification information 1 and device serial number B, the identification information 2 and device serial number C of display device C, and the identification information 3 and device serial number D of display device D to display device A.

Display device A repeats the above process, obtains its own identification information according to the identification information provided by display device B, and modifies the identification information provided by display device B. At this time, display device A is equivalent to the first display device, and display device B is equivalent to the second display device. Finally, display device A transmits its own identification information 1 and device serial number A, identification information 2 and device serial number B of display device B, identification information 3 and device serial number C of display device C, and identification information 4 and device serial number D of display device D to the host.

So far, the host has obtained the identification information and attribute information of each display device in the chain system, such that the connection sequence of display devices A to D can be determined based on the identification information.

In the above process, the information transmitted by each display device to the previous display device, such as the information transmitted by display device D to display device C, will eventually be transmitted to the host after modification. Therefore, the process of each display device transmitting information to the previous display device and the process of display device A transmitting information to the host can be equivalent to S104 of the present disclosure, that is, transmitting the first identification information and the second identification information to the electronic device.

The following examples illustrate some use scenarios of the identification information of each display device.

Scenario 1: after the electronic device obtains the identification information of each display device, it determines the correspondence between the identification information of each display device and the attribute information of each display device. Taking the system shown in FIG. 2 as an example, after obtaining the identification information 1 to 4 of display devices A to D, it determines the correspondence between the identification information and the device serial number, that is, serial number 1 corresponds to device serial number A, serial number 2 corresponds to device serial number B, serial number 3 corresponds to device serial number C, and serial number 4 corresponds to device serial number D.

Therefore, when the electronic device displays images currently displayed by each display device to a user, it can synchronously display the identification information of the corresponding display device, such as the serial number, at a specific position of each image, such as the upper left corner.

When the user needs to adjust one of the images, the user may select the identification information corresponding to the image, and then the electronic device determines which display device the image to be adjusted belongs to based on the correspondence between the identification information and the attribute information. Then the electronic device generates corresponding instruction information based on a user's operation, and sends the instruction information and the attribute information of the display device to be adjusted to the display devices in the chain system. Each display device may determine whether the attribute information is its own attribute information. If so, the display device executes the received instruction information. If not, it continues to pass it to a subsequent display device.

Scenario 2: the electronic device determines the instruction information that needs to be sent to the display device, determines at least one display device that needs to execute the instruction information, and determines the identification information of these display devices as the target identification information. Then the electronic device sends the instruction information and the target identification information to the display devices in the chain system. At this time, after receiving the instruction information and the target identification information, the first display device may perform the following processes: obtaining the instruction information and the target identification information output by the electronic device; if the target identification information matches the first identification information, adjusting a state of the first display device in response to the instruction information; if the target identification information does not match the first identification information, transmitting the instruction information and the target identification information to the second display device.

The target identification information matching the first identification information may include: the target identification information beings consistent with the first identification information, or at least one of the multiple target identification information beings consistent with the first identification information.

The instruction information may be a state control instruction for controlling the state of the display device, such as a sleep instruction, and the instruction information may also be a firmware upgrade instruction for upgrading the display device.

In some embodiments, the firmware upgrade instruction may carry an upgrade package for upgrading, or may not carry an upgrade package. For the latter case, the display device that needs to be upgraded may read the upgrade package under the storage path indicated by the firmware upgrade instruction, or the display device that needs to be upgraded may obtain and store the upgrade package in advance in other ways.

Figure 4:
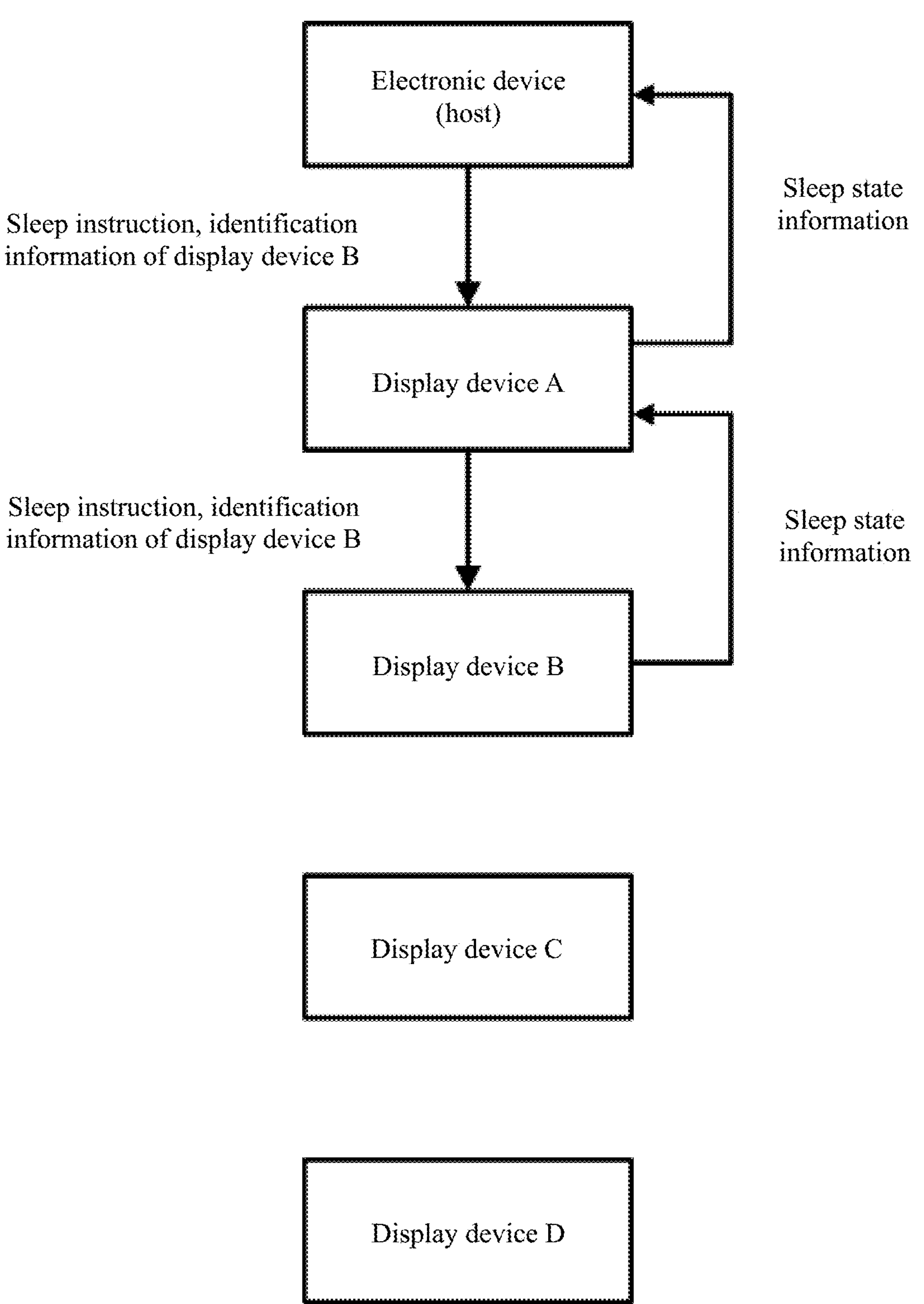
FIG. 4 is a schematic diagram of performing firmware upgrade on a display device according to some embodiments of the present disclosure.

For example, FIG. 4 is a schematic diagram of performing firmware upgrade on a display device according to some embodiments of the present disclosure. FIG. 4 is an example of Scenario 2. In this example, the instruction information determined by the electronic device is the sleep instruction, and the determined target identification information is the identification information of display device B. After the electronic device determines the sleep instruction and the target identification information, it first sends the information to the directly connected display device A. At this time, display device A, as the first display device, compares the target identification information with its own identification information, and finds that the two do not match, so it transmits the information to the subsequent display device, that is, display device B.

After display device B obtains the information, as the first display device, it compares its own identification information with the received target identification information, and finds that the two match, so display device B executes the sleep instruction and enters the sleep state.

After entering the sleep state, display device B feeds back sleep state information to display device A. The sleep state information is used to indicate that display device B is already in the sleep state. Display device A then feeds back the sleep state information to the electronic device.

Figure 5:
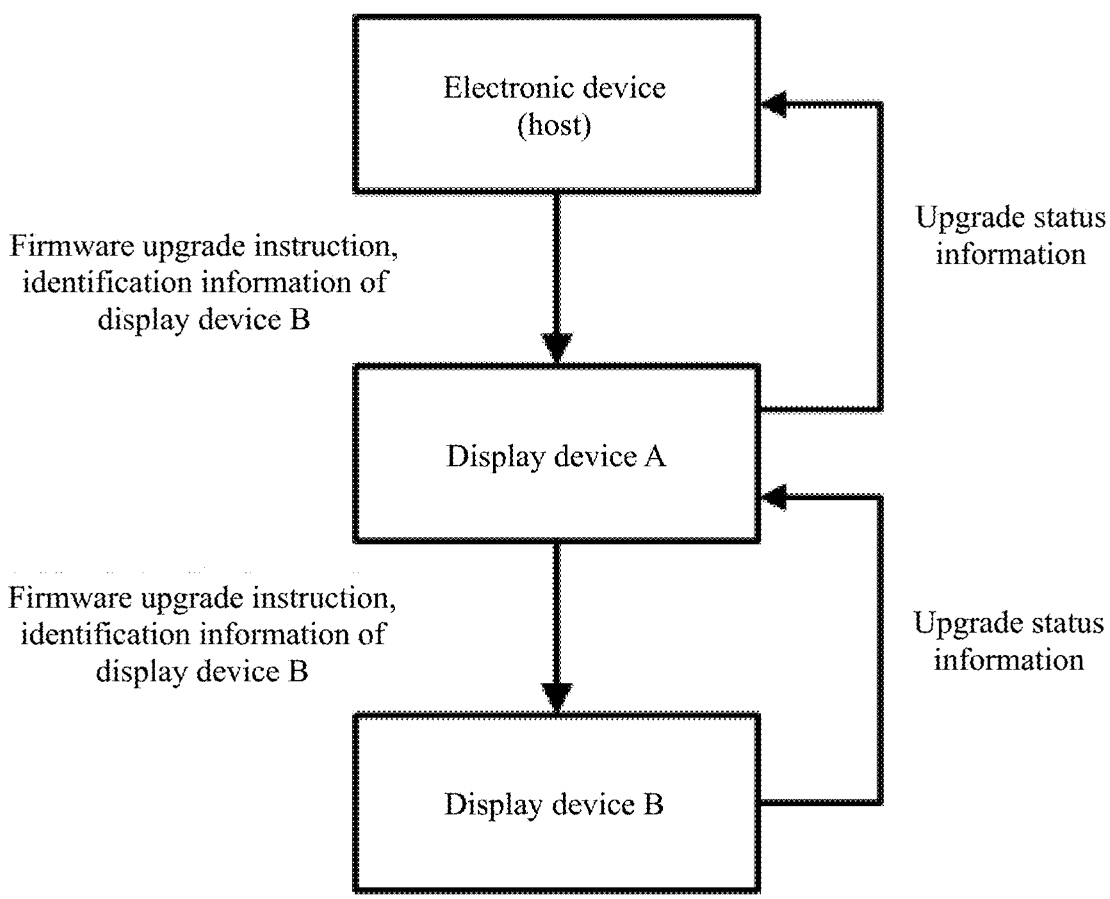
FIG. 5 is a schematic diagram of controlling the state of a display device according to some embodiments of the present disclosure.

For example, FIG. 5 is a schematic diagram of controlling the state of a display device according to some embodiments of the present disclosure. FIG. 5 is another example of Scenario 2. In this example, the instruction information determined by the electronic device is the firmware upgrade instruction, and the determined target identification information is the identification information of display device B. After the electronic device determines the firmware upgrade instruction and the target identification information, it first sends the information to the directly connected display device A. At this time, display device A, as the first display device, compares the target identification information with its own identification information and finds that the two do not match, so it transmits the information to the subsequent display device, that is, display device B.

After display device B obtains the information, as the first display device, it compares its own identification information with the received target identification information and finds that the two match, so display device B executes the firmware upgrade instruction and uses the upgrade package to perform the firmware upgrade.

After the upgrade is completed, display device B feeds back the upgrade status information to display device A. The upgrade status information is used to indicate that display device B has completed the firmware upgrade. Display device A then feeds back the upgrade status information to the electronic device.

In some embodiments, when the first display device does not display image data, that is, when the first display device is in the sleep state, it may still transmit the received instruction information and target identification information to subsequent display devices. Taking the system shown in FIG. 2 as an example, when display device A is in the sleep state, it may still transmit the instruction information to subsequent display devices B, C and D.

In other words, the method of the present disclosure may also include the following processes. When the first display device does not display image data, the instruction information and the target identification information are transmitted to the second display device.

In some embodiments, the first display device may include multiple input interfaces, for example, a first interface and a third interface.

The first display device obtains second image data output by the electronic device through the first interface. The first interface is directly connected to the electronic device or the first interface is connected to the electronic device through a fifth display device. The first display device obtains third image data output by the electronic device through the third interface. The third interface is directly connected to the electronic device. The second image data is output in a first display area of the first display device, and the third image data is output in a second display area of the first display device. The first display area and the second display area are different.

The first display device may display the second image data and the third image data in various display modes. Some display modes are described as follows. Display mode 1, the first display device displays the second image data in full screen, and then creates a smaller window on the screen to display the third image data in the window. Alternatively, the first display device displays the third image data in full screen and displays the second image data in the small window. Display mode 2, the first display device divides the display screen into two parts, such as upper and lower parts, or left and right parts. One part displays the second image data, and the other part displays the third image data.

The present disclosure provides the following beneficial effects. By implementing the present disclosure, between the first display device, the second display device, and the electronic device connected in sequence, the first display device provides the electronic device with its own identification information, as well as the identification information of the second display device connected to the electronic device through itself, such that the electronic device can determine the connection sequence of each connected display device based on the identification information, thereby meeting the needs of the electronic device to communicate with other connected display devices based on the connection sequence in certain scenarios.

Figure 6:
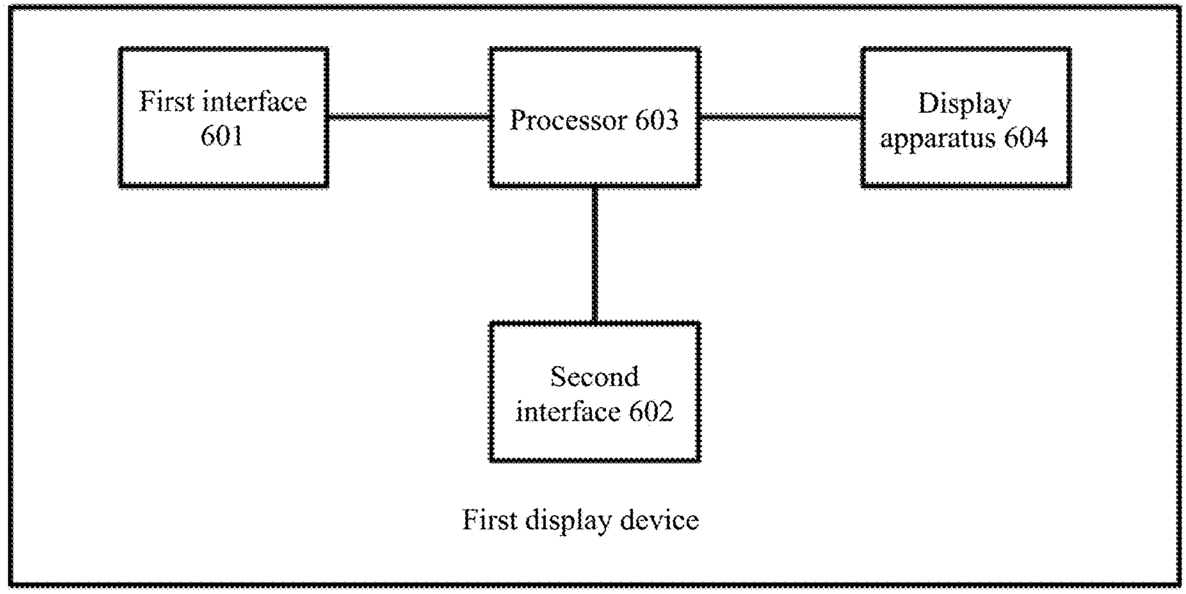
FIG. 6 is a schematic structural diagram of a display device according to some embodiments of the present disclosure.

The present disclosure also provides a display device. The display device may be the first display device described in the previous embodiments. FIG. 6 is a schematic structural diagram of a display device according to some embodiments of the present disclosure. As shown in FIG. 6, the first display device includes a first interface 601, a second interface 602, a processor 603, and a display apparatus 604. The first interface 601 is connected to an electronic device. The second interface 602 is connected to a second display device. The display apparatus 604 is used to display image data obtained from the electronic device. The processor 603 is used to: in response to a trigger condition being met, output trigger information to the second display device; obtain second identification information output by the second display device in response to the trigger information; obtain first identification information of the first display device; and transmit the first identification information and the second identification information to the electronic device. The first identification information and the second identification information represent a connection sequence of the first display device and the second display device. The electronic device, the first display device, and the second display device are connected in sequence. The first display device obtains first image data from the electronic device and transmit part or all of the first image data to the second display device.

The first interface may be regarded as the input interface of the display device shown in FIG. 2, and the second interface may be regarded as the output interface of the display device shown in FIG. 2.

In some embodiments, the trigger condition includes at least one of the following. The first display device obtains a target signal output by the electronic device. The first display device establishes a connection with the electronic device.

In some embodiments, when obtaining the first identification information of the first display device, the processor 603 is configured to: determine the first identification information according to the second identification information.

In some embodiments, when determining the first identification information according to the second identification information, the processor 603 is further configured to perform at least one of the following: determining the first identification information according to a first relative position relationship between the first display device and the second display device, and the second identification information of the second display device; and obtaining the identification information that is not repeated with the second identification information as the first identification information.

In some embodiments, the processor 603 is further configured to: obtain third identification information output by a third display device in response to the trigger information through the second display device, the trigger information being transmitted from the second display device to the third display device, and the third display device being connected to the first display device through the second display device; modify the second identification information according to the first relative position relationship to obtain modified second identification information; and modify the third identification information according to the first relative position relationship to obtain modified third identification information, the modified third identification information representing the connection sequence of the third display device. When transmitting the first identification information and the second identification information to the electronic device, the processor 603 is further configured to: transmit the first identification information, the modified second identification information, and the modified third identification information to the electronic device.

In some embodiments, when determining the first identification information according to the first relative position relationship between the first display device and the second display device, and the second identification information of the second display device, the processor 603 is further configured to: determine the second identification information as the first identification information; and modify the second identification information according to the first relative position relationship to obtain the modified second identification information, which includes: determining the third identification information as the modified second identification information.

In some embodiments, if the first display device is connected to the electronic device through a fourth display device, when obtaining the first identification information, the processor 603 in the first display device is further configured to: obtain feedback information output by the fourth display device, the feedback information including the fourth identification information of the fourth device and at least one update identification information; determine, based on the second relative position relationship between the first display device and the fourth display device, and the fourth identification information, that the target update identification information in the at least one update identification information is the first identification information of the first display device.

In some embodiments, when transmitting the first identification information and the second identification information to the electronic device, the processor 603 is further configured to: transmit the first identification information and the first attribute information of the first display device, and the second identification information and the second attribute information of the second display device to the electronic device.

In some embodiments, the processor 603 is further configured to: obtain the instruction information and the target identification information output by the electronic device; if the target identification information matches the first identification information, adjust the state of the first display device in response to the instruction information; if the target identification information does not match the first identification information, transmit the instruction information and the target identification information to the second display device.

In some embodiments, the processor 603 is further configured to: when the first display device does not display image data, transmit the instruction information and the target identification information to the second display device.

In some embodiments, the processor 603 is further configured to: obtain the second image data output by the electronic device through the first interface, the first interface being directly connected to the electronic device or the first interface being connected to the electronic device through a fifth display device; obtain the third image data output by the electronic device through the third interface, the third interface being directly connected to the electronic device; and output the second image data in the first display area of the first display device, and the third image data in the second display area of the first display device, the first display area and the second display area being different. For the operation principle and beneficial effects of the display device provided in the present disclosure, reference can be made to the relevant processes and beneficial effects of the processing method provided in the present disclosure, and the description thereof will not be repeated.

It should be noted that each embodiment in the specification is described in a progressive manner, and each embodiment focuses on the differences from other embodiments, and the same and similar parts between the embodiments can refer to each other.

For the convenience of description, the above system or device is described by function and is divided into various modules or units for separate description. Of course, when implementing the present disclosure, the functions of each unit can be implemented in the same or multiple software and/or hardware.

It can be seen from the description of the above embodiments that a person skilled in the art can clearly understand that the present disclosure can be implemented by means of software plus a necessary general hardware platform. Based on this understanding, the technical solution of the present disclosure, or the part that contributes in addition to the prior art, can be embodied in the form of a software product, which can be stored in a storage medium, such as ROM/RAM, a disk, an optical disk, etc., and includes several instructions for a computer device (which can be a personal computer, a server, or a network device, etc.) to perform the method described in various embodiments or certain parts of the embodiments of the present disclosure.

Finally, it should be noted that in the specification, relational terms such as first, second, third and fourth are only used to distinguish one entity or operation from another entity or operation, and do not necessarily require or imply any such actual relationship or order between these entities or operations. Moreover, the terms "include", "comprise" or any other variant thereof are intended to cover non-exclusive inclusion, so that a process, method, article or device including a series of elements includes not only those elements, but also other elements not explicitly listed, or also includes elements inherent to such a process, method, article or device. In the absence of further restrictions, the elements defined by the sentence "including one . . . " do not exclude the existence of other identical elements in the process, method, article or device including the elements.

The above description is merely some embodiments of the present disclosure. It should be pointed out that for ordinary technicians in this technical field, various improvements and modifications can be made without departing from the principles of the present disclosure. These improvements and modifications should also be regarded as the scope of protection of the present disclosure.

What is claimed is:

1. A processing method, comprising:

outputting, by first display device, trigger information to a second display device in response to a trigger condition being met;

obtaining, by the first display device, second identification information output by the second display device in response to the trigger information, the second identification information being indicative of a hop count associated with the second display device from an end display device of a display device chain, wherein the second identification information is determined by the second display device by: outputting the trigger information from an output interface of the second display device; in response to not receiving third identification information from any third display device connected to the output interface of the second display device in response to the trigger information, determining that the second display device is the end display device and setting the hop count to 1; and in response to receiving the third identification information output by a third display device connected to the output interface of the second display device in response to the trigger information, determining the hop count based on the third identification information;

obtaining, by the first display device, first identification information of the first display device, the first identification information being determined based on the second identification information and a first relative position relationship between the first display device and the second display device; and transmitting, by the first display device, the first identification information and the second identification information to an electronic device, the first identification information and the second identification information representing a connection sequence of the first display device and the second display device;

wherein, the electronic device, the first display device, and the second display device are connected in sequence, and the first display device obtains first image data from the electronic device and transmits part or all of the first image data to the second display device.

2. The method according to claim 1, wherein:

the trigger condition includes at least one of the following: the first display device obtaining a target signal output by the electronic device or the first display device establishing a connection with the electronic device.

3. The method according to claim 1, wherein the first identification information further comprises identification information that is not repeated with the second identification information.

4. The method according to claim 1, further comprising:

obtaining the third identification information output by the third display device in response to the trigger information through the second display device, the trigger information being transmitted by the second display device to the third display device, and the third display device being connected to the first display device through the second display device;

modifying the second identification information according to the first relative position relationship between the first display device and the second display device to obtain modified second identification information; and modifying the third identification information according to the first relative position relationship to obtain modified third identification information, and the modified third identification information representing a connection sequence of the third display device;

wherein transmitting the first identification information and the second identification information to the electronic device includes transmitting the first identification information, the modified second identification information, and the modified third identification information to the electronic device.

5. The method according to claim 4, wherein:

determining the first identification information according to the first relative position relationship between the first display device and the second display device, and the second identification information of the second display device includes: determining the second identification information as the first identification information; and modifying the second identification information according to the first relative position relationship to obtain the modified second identification information includes: determining the third identification information as the modified second identification information.

6. The method according to claim 1, wherein:

in response to the first display device being connected to the electronic device through a fourth display device, obtaining the first identification information by the first display device includes:

obtaining feedback information output by the fourth display device, the feedback information including fourth identification information of the fourth display device and at least one update identification information; and determining that target update identification information in the at least one update identification information is the first identification information of the first display device according to a second relative position relationship between the first display device and the fourth display device, and the fourth identification information.

7. The method according to claim 1, wherein:

transmitting the first identification information and the second identification information to the electronic device includes: transmitting the first identification information and a first attribute information of the first display device, and the second identification information and a second attribute information of the second display device to the electronic device.

8. The method according to claim 1, further comprising:

obtaining instruction information and target identification information output by the electronic device;

if the target identification information matches the first identification information, adjusting a state of the first display device in response to the instruction information;

if the target identification information does not match the first identification information, transmitting the instruction information and the target identification information to the second display device.

9. The method according to claim 8, further comprising:

when the first display device does not display image data, the instruction information and the target identification information are transmitted to the second display device.

10. The method according to claim 1, further comprising:

obtaining, by the first display device, second image data output by the electronic device through a first interface, the first interface being directly connected to the electronic device or the first interface being connected to the electronic device through a fifth display device;

obtaining, by the first display device, third image data output by the electronic device through a second interface, the second interface being directly connected to the electronic device; and outputting the second image data in a first display area of the first display device, and the third image data in a second display area of the first display device, the first display area and the second display area being different.

11. The method according to claim 1, wherein the end display device is a display device on the display device chain whose output interface is not connected to any other display device.

12. The method according to claim 1, wherein the second identification information comprises a record in a data structure, and the data structure include a plurality of records arranged in a connection sequence of display devices on the display device chain.

13. A display device, the display device being a first display device comprising:

a first interface connected to an electronic device;

a second interface connected to a second display device;

a display apparatus configured to display image data obtained from the electronic device; and a processor configured to:

output trigger information to the second display device in response to a trigger condition being met;

obtain second identification information output by the second display device in response to the trigger information, the second identification information being indicative of a hop count associated with the second display device from an end display device of a display device chain, wherein the second identification information is determined by the second display device by: outputting the trigger information from an output interface of the second display device; in response to not receiving third identification information from any third display device connected to the output interface of the second display device in response to the trigger information, determining that the second display device is the end display device and setting the hop count to 1; and in response to receiving the third identification information output by a third display device connected to the output interface of the second display device in response to the trigger information, determining the hop count based on the third identification information;

obtain first identification information of the first display device, the first identification information being determined based on the second identification information and a relative position relationship between the first display device and the second display device; and transmit the first identification information and the second identification information to the electronic device, the first identification information and the second identification information representing a connection sequence of the first display device and the second display device;

wherein, the electronic device, the first display device, and the second display device are connected in sequence, and the first display device obtains first image data from the electronic device and transmits part or all of the first image data to the second display device.

14. The display device according to claim 13, wherein:

the trigger condition includes at least one of the following: the first display device obtaining a target signal output by the electronic device or the first display device establishing a connection with the electronic device.

15. The display device according to claim 13, wherein the first identification information further comprises identification information that is not repeated with the second identification information.

16. The display device according to claim 13, wherein the processor is further configured to:

obtain the third identification information output by the third display device in response to the trigger information through the second display device, the trigger information being transmitted by the second display device to the third display device, and the third display device being connected to the first display device through the second display device;

modify the second identification information according to the first relative position relationship between the first display device and the second display device to obtain modified second identification information; and modify the third identification information according to the first relative position relationship to obtain modified third identification information, and the modified third identification information representing a connection sequence of the third display device;

wherein when transmitting the first identification information and the second identification information to the electronic device, the processor is further configured to transmit the first identification information, the modified second identification information, and the modified third identification information to the electronic device.

17. The display device according to claim 16, wherein:

when determining the first identification information according to the first relative position relationship between the first display device and the second display device, and the second identification information of the second display device, the processor is further configured to: determine the second identification information as the first identification information; and when modifying the second identification information according to the first relative position relationship to obtain the modified second identification information, the processor is further configured to: determine the third identification information as the modified second identification information.

18. The display device according to claim 13, wherein:

when obtaining the first identification information by the first display device in response to the first display device being connected to the electronic device through a fourth display device, the processor is further configured to:

obtain feedback information output by the fourth display device, the feedback information including fourth identification information of the fourth display device and at least one update identification information; and determine that target update identification information in the at least one update identification information is the first identification information of the first display device according to a second relative position relationship between the first display device and the fourth display device, and the fourth identification information.

19. The display device according to claim 13, wherein:

when transmitting the first identification information and the second identification information to the electronic device, the processor is further configured to: transmit the first identification information and the first attribute information of the first display device, and the second identification information and the second attribute information of the second display device to the electronic device.

20. The display device according to claim 13, wherein the processor is further configured to:

obtain instruction information and target identification information output by the electronic device;

if the target identification information matches the first identification information, adjust a state of the first display device in response to the instruction information;

if the target identification information does not match the first identification information, transmit the instruction information and the target identification information to the second display device.

* * * * *